(12) United States Patent
Onwulata

(10) Patent No.: US 7,851,010 B2
(45) Date of Patent: Dec. 14, 2010

(54) PROCESS OF MAKING A PRODUCT CONTAINING AT LEAST PARTIALLY DENATURED MILK PROTEIN

(75) Inventor: Charles I. Onwulata, Cheltenham, PA (US)

(73) Assignee: The United States of America, as represented by the Secretary of Agriculture, Washington, DC (US)

(*) Notice: Subject to any disclaimer, the term of this patent is extended or adjusted under 35 U.S.C. 154(b) by 1144 days.

(21) Appl. No.: 11/487,802

(22) Filed: Jul. 17, 2006

(65) Prior Publication Data

US 2006/0292287 A1 Dec. 28, 2006

Related U.S. Application Data

(63) Continuation-in-part of application No. 10/767,979, filed on Jan. 29, 2004, now abandoned, which is a continuation-in-part of application No. 10/686,834, filed on Oct. 16, 2003, now abandoned.

(51) Int. Cl.
*A23J 1/00* (2006.01)
(52) U.S. Cl. .................. 426/656; 426/657; 426/804; 426/580; 426/583
(58) Field of Classification Search .................. 426/656, 426/657, 804, 580, 583
See application file for complete search history.

(56) References Cited

U.S. PATENT DOCUMENTS

| 3,870,805 A | * | 3/1975 | Hayes et al. | 426/656 |
|---|---|---|---|---|
| 4,315,954 A | * | 2/1982 | Kuipers et al. | 426/583 |
| 4,338,340 A | * | 7/1982 | Morimoto et al. | 426/104 |
| 5,413,804 A | | 5/1995 | Rhodes | |
| 6,607,777 B1 | * | 8/2003 | Walsh et al. | 426/583 |
| 7,235,276 B2 | | 6/2007 | Allen et al. | |

OTHER PUBLICATIONS

Singh et al, "Selected Characteristics of Extruded Blends of Milk Protein Raffinate or Nonfat Dry Milk with Corn Flour" Dept. of Food Science, pp. 285-302. 1991.*

* cited by examiner

*Primary Examiner*—Anthony Weier
(74) *Attorney, Agent, or Firm*—John D. Fado; C. Byron Stover

(57) ABSTRACT

The present invention relates to a dietary composition produced by a process involving extruding a protein containing product and water through an extruder (e.g., at about 50-about 450 rpm and at a temperature of about 40° to about 120° C., wherein the residence time of the protein containing product (e.g., whey protein isolate) in the extruder is about 15-about 90 seconds) to produce the dietary composition, wherein the dietary composition contains partially denatured protein containing product or totally denatured protein containing product or mixtures thereof. The present invention also concerns a food product containing at least one food ingredient and a dietary fiber composition. The food product is produced by a process involving extruding the dietary composition and at least one food ingredient and water to produce the food product; the dietary composition produced by a process involving extruding a protein containing product and water through an extruder to produce the dietary composition, wherein the dietary composition contains partially denatured protein containing product or totally denatured protein containing product or mixtures thereof.

11 Claims, 4 Drawing Sheets

US 7,851,010 B2

PROCESS OF MAKING A PRODUCT CONTAINING AT LEAST PARTIALLY DENATURED MILK PROTEIN

REFERENCE TO RELATED APPLICATION

This application claims the benefit of U.S. patent application Ser. No. 10/686,834, filed 16 Oct. 2003, and U.S. patent application Ser. No. 10/767,979, filed 29 Jan. 2004, which are incorporated herein by reference in their entirety.

BACKGROUND OF THE INVENTION

The present invention relates to a dietary composition produced by a process involving extruding a protein containing product and water through an extruder at about 50-about 450 rpm and at a temperature of about 40° to about 120° C. to produce the dietary composition, wherein the residence time of the protein containing product (e.g., whey protein isolate) in the extruder is about 15-about 90 seconds, wherein the dietary composition contains partially denatured protein containing product or totally denatured protein containing product or mixtures thereof. The present invention also concerns a food product containing at least one food ingredient and a dietary fiber composition. The food product is produced by a process involving extruding the dietary composition and at least one food ingredient and water to produce the food product; the dietary composition is produced by a process involving extruding a protein containing product and water through an extruder to produce the dietary composition, wherein the dietary composition contains partially denatured protein containing product or totally denatured protein containing product or mixtures thereof.

As the reports of the health and nutraceutical benefits of consuming dietary fibers continue to grow, research is focused on increasing the amount, content and quality of fibers in human diet. Consumers as well as nutrition-focused professional organizations are demanding increased amounts of fiber in processed foods. The results of recent surveys of the amount of fiber consumed by Americans reveal that most consume less than 50% of the estimated desirable daily fiber intake. Current average fiber intake is estimated at about 12 g/day, but the American Dietetic Association recommends 20-35 g/day (J. Am. Dietetic Assoc., 93: 1446-1447 (1993)).

Foods rich in fiber help with the management of a host of conditions. Associated healthful benefits of increasing fiber consumption include reduced risk of some types of cancer (including breast cancer) and coronary heart disease, regulation of blood glucose and insulin, lowering the concentration of blood lipids, reduced risk of cardiovascular disease and controlling diabetes, alleviating constipation, hemorrhoids and diverticulitis (Wolk, A., et al., JAMA, 281(21): 1998-2004 (1999); Kritchevsky, D., Cereal Foods World, 42(2): 81-85 (1977)). Thus it is desirable and beneficial to increase the amount of fiber in most prepared foods.

The Food and Agricultural Organization/World Health Organization (FAO/WHO), 1995 Codex Alimentarius Commission defines dietary fiber as, "the edible plant or animal material not hydrolyzed by the endogenous enzymes of the human digestive tract as determined by the agreed upon method." Typical fiber sources are plant-based and include grains, fruits and vegetables; other less-traditional food fibers include Chitosan, a fat-binding dietary fiber derived from shellfish, and polymeric components such as cell-wall proteins and phenolic compounds such as tannin and cutin.

Traditionally, the food industry uses native (folded) whey proteins for their functional and nutritional properties in formulating different foods. Though new products incorporating whey proteins, such as sports drinks, are being developed, innovation in process and product development is still needed (Anon., American Dairy Products Institute, Bulletin No. 25, p. 17 (2000)). Fortifying snacks with whey proteins could provide a particularly attractive outlet for surplus whey proteins; however, this practice has been limited due to known adverse textural effects when the whey protein concentrate supplementation is greater than 10% of the main starch component (Kim, C. H., and J. A. Maga, Lebensmittel-Wissenchaft und-Technologie, 20: 311-318 (1987)).

The present invention provides, in one aspect, proteins (e.g., whey proteins) that are totally denatured and are insoluble to enzymes and protein cleaving chemicals (e.g., urea). The new product is indigestible and can therefore serve as a fiber source. The fiber-like product described in this invention may be from an animal source (e.g., milk), but its properties are physiologically similar to plant-source dietary fiber, thus serving as a bulking agent and being nondigestible to enzymes. Alternate use for this product include use in biodegradable products and utilization in ingredients that require low gelling temperatures.

SUMMARY OF THE INVENTION

In accordance with the present invention there is provided a dietary composition produced by a process involving extruding a protein containing product and water through an extruder at about 50-about 450 rpm and at a temperature of about 40° to about 120° C. to produce the dietary composition, wherein the residence time of the protein containing product (e.g., whey protein isolate) in the extruder is about 15-about 90 seconds, wherein the dietary composition contains partially denatured protein containing product or totally denatured protein containing product or mixtures thereof. Also in accordance with the present invention there is provided a food product containing at least one food ingredient and a dietary fiber composition. The food product is produced by a process involving extruding the dietary composition and at least one food ingredient and water to produce the food product; the dietary composition is produced by a process involving extruding a protein containing product and water through an extruder to produce the dietary composition, wherein the dietary composition contains partially denatured protein containing product or totally denatured protein containing product or mixtures thereof.

DETAILED DESCRIPTION OF THE INVENTION

Figure 1:
FIG. 1 shows electron micrograms of whey protein isolates (WPI): (A) scanning microscopy was used to examine dry powder; (B) the non extruded WPI Paste (40% moisture) was embedded, stained with uranyl acetate and sections examined by transmission electron microscopy; (C) extruded (100° C.) WPI (40% moisture) treated as in (B)

The present invention relates to a dietary composition containing partially or completely denatured proteins. The dietary composition is produced by a process wherein the proteins in a protein containing product (e.g., milk protein containing product such as milk, milk concentrate, milk protein concentrate, whey, whey concentrate, preferably whey protein isolate) are partially or completely denatured. This process involves processing the protein containing product through an extruder (e.g., single screw extruder, preferably twin screw extruder) at low shear (generally about 50-about 450 rpm (e.g., 50-450 rpm), preferably about 50-about 300 rpm (e.g., 50-300 rpm), more preferably about 50-about 200 rpm (e.g., 50-200 rpm), most preferably about 50-about 100 rpm (e.g., 50-100 rpm)), at a temperature in the extruder of about 40° to about 120° C. (e.g., 40° to 120° C.). Pressures may range from about 10 to about 2000 psi (e.g., 10-2000 psi, preferably about 500 to about 1500 psi (e.g., 500-1500 psi), more preferably about 800 to about 1200 psi (e.g., 800-1200 psi)), and torque may range from about 30 to about 70% (e.g., 30-70%, preferably about 45 to about 55% (e.g., 45-55%)). Residence time of the protein containing product in the extruder is generally about 15-about 90 seconds (e.g., 15-90 seconds), preferably about 20-about 75 seconds (e.g., 20-75 seconds), and more preferably about 35-about 60 seconds (e.g., 35-60 seconds). To produce a dietary composition containing completely denatured proteins, the temperature generally is about 90° to about 120° C. (e.g., 90° to 120° C.), more preferably about 95° to about 120° C. (e.g., 95° to 120° C.), most preferably about 1000 to about 110° C. (e.g., 100° to 110° C.); the shear is preferably about 50 to about 100 rpm (e.g., 50-100 rpm). Completely denatured proteins are generally ≧95% (e.g., 95%) denatured, preferably ≧99% (e.g., 99%) denatured, more preferably about 100% (e.g., 100%) denatured. To produce a dietary composition containing partially denatured proteins, the temperature generally is about 40° to about 90° C. (e.g., 40° to 90° C.), more preferably about 55° to about 80° C. (e.g., 55° to 80° C.), most preferably about 60° to about 70° C. (e.g., 60° to 70° C.); the shear is preferably about 150 to about 250 rpm (e.g., 150-250 rpm). Partially denatured proteins are generally <95% denatured, preferably <about 90% (e.g., <90%) denatured, more preferably about 40-about 80% (e.g., 40-80%) denatured. Low shear increases the residence time of the milk containing product in the extruder since residence time is a function of the rpm of the extruder, the residence time can increase from 45 to 90 seconds. The process may also utilize other proteins such as, for example, soy protein, vegetable protein, animal protein. The dietary composition is a dietary fiber composition when it contains completely denatured proteins since completely denatured proteins are indigestible.

The present invention also concerns a food product containing at least one food ingredient and the dietary composition (containing partially or completely denatured proteins or combinations thereof) described above; the food product is a fiber enriched food product if it contains at least one food ingredient and the dietary composition containing completely denatured proteins. The food ingredient may be any food ingredient. For example, the food ingredient may be the ingredients for cookies or muffins such as flour. Furthermore, the food ingredient may be shelf-stable packaged pre-mixes for preparing food and beverage compositions, usually requiring the addition of other ingredients (e.g., eggs, shortening, water or milk) to be supplied and added by the preparer. Additionally, the food ingredient may be a ready-to-cook mix (combined food ingredients that require additional cooking (e.g., baking, frying, micro waving) to form a ready-to-eat food or beverage product). Generally, the food product (e.g., fiber enriched) may be any food product such as a drink, yogurt, or pizza, or a bakery product such as cake, biscuit, pie crust, cookie, muffin, bread, cereal, doughnut, noodle, brownie, cracker or snack food. The amount of the dietary composition contained in the enriched food product may be any amount that does not adversely affect the food product (for example, the food product may contain about 1% to about 40% of the dietary composition, preferably about 5% to about 30%, more preferably about 5% to about 20%, most preferably about 10% to about 15%).

The dietary composition containing partially denatured proteins of the present invention may be used to create a totally expanded or puffed snack food product (or pellets or half products), which may be fully cooked or ready-to-eat, that also contains at least one food ingredient (e.g., any starch source such as corn, wheat, rice, barley, rye, potato). Currently, unmodified milk protein containing products (e.g., whey) when added to expanded products collapse the matrix and do not puff, and thus it is necessary to limit substituting whey for starch to about 5%. Surprisingly, the dietary composition containing partially denatured proteins can replace well over 5% of the starch without affecting puff characteristics while allowing one to obtain desirable crunch and crispness notwithstanding the high level of milk protein containing products contained therein. The dietary composition containing partially denatured proteins can replace more than about 35% of the starch without affecting puff characteristics. Generally, the composition containing partially denatured proteins can replace >0% to about 60% of the starch (e.g., >0-60%), preferably >5% to about 60% (e.g., >5-60%), more preferably about 10-about 50% (e.g., 10-50%), most preferably about 20-about 40% (e.g., 20-40%). The totally expanded or puffed snack food product may contain about 5-about 80% (e.g., 5-80%) of the dietary composition containing partially denatured proteins, preferably about 15-about 60% (e.g., 15-60%), more preferably about 20-about 40% (e.g., 20-40%). The expanded or puffed food product (or pellets or half products) may be made by methods known in the art. For example, the dietary composition containing partially denatured proteins of the present invention was blended with corn meal at the ratio of 25 g of the dietary composition containing partially denatured proteins and 75 g corn meal. The blend of corn meal and the dietary composition containing partially denatured proteins was extruded in a ZSK30 twin screw extruder (Krupp, Werner & Pfleiderer Company, Ramsey, N.J.) consisting of nine heating-barrel sections each individually controlled; the first six zones were preset at 35°, 35°, 50°, 50°, 75°, and 90° C. respectively, and the last 3 barrel temperatures were set at 100°, 110° and 125° C., respectively. The die plate was fitted with two circular inserts (3.18 mm diameter). Melt temperatures was recorded at the die. The blend was fed into the extruder with a series 6300 digital type 35 twin screw volumetric feeder (K-Tron Corp., Pitman, N.J.) at a constant setting of 800 rpm yielding a feed rate of 128.5 g/min. Water was added at a rate of 1.3 L/h with an electromagnetic dosing pump (Milton Roy, Acton Mass.) to bring the moisture content of the feed to approximately 18 g $H_2O$/100 g product (wet basis). The screw speed of the extruder was maintained at 300 rpm. The screw elements were selected to provide high shear at 300 rpm by adding kneading blocks to the configuration. The process may also utilize other proteins such as, for example, soy protein, vegetable protein, animal protein, and other carbohydrate sources such as wheat, barley, rice, and starch.

The dietary composition containing completely denatured proteins of the present invention can be added to baked sweet wafers to offer another type of protein enrichment to cookies or snack bars. It may also be possible to utilize the dietary composition containing completely denatured proteins of the present invention in meal extenders and meat alternatives, function as instant thickeners for beverage and dairy applications, and also finding use as edible films and encapsulating agents. The dietary composition containing completely denatured proteins of the present invention may also function as an instant thickening product which can be used in place of starch and other hydrocolloids; potential applications include baby food, sports drink and dairy foods such as sour cream, yogurt and cottage cheese.

The possibilities for the dietary composition containing completely denatured proteins of the present invention extend past the grocery aisle. The dietary composition containing completely denatured proteins of the present invention may make oxygen, aroma and oil barrier films at low-to-intermediate relative humidity; may provide mechanical properties and adequate functionality when used as coating or encapsulating agents, providing durability when applied directly on foods or as films when separating layers of heterogeneous foods, or films formed into pouches for food ingredients; and may also be used as encapsulating agents.

Additionally, the present invention also relates to a method of making a food product involving adding the dietary composition of the present invention to one or more food ingredients (or vice versa). For example, in making cookies or muffins, the dietary composition of the present invention can partially substitute for flour or be added in addition to flour in the preparation of cookies or muffins. If cooking (e.g., baking, flying, micro waving) is required, then normal cooking conditions are utilized. Furthermore, the present invention concerns a method of increasing fiber in the diet of a mammal involving feeding to the mammal the fiber enriched food product described herein. Generally, the mammal is a human.

Denaturation of proteins such as milk containing products may be measured by methods known in the art, including the solubility index and the method of Kilara (Kilara, A., J. Dairy Sci., 67:2734-2744 (1984)) where protein insolubility (denaturation) was calculated as: (% Total Protein–% Soluble Protein=% Insoluble (denatured)). Proteins which are partially denatured will absorb more water than proteins which are totally denatured. Partially denatured proteins are partly soluble and partly insoluble depending on the temperature and severity of shear. Totally denatured proteins are totally insoluble.

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described.

The following examples are intended only to further illustrate the invention and are not intended to limit the scope of the invention as defined by the claims.

EXAMPLES

Materials And Methods: Whey protein concentrate (ALACEN 834) and lactalbumin (ALATAL 825) were purchased from New Zealand Milk Products, Inc. (Santa Rosa, Calif.). Whey Protein Isolate (PROVON 190) was purchased from Glanbia Ingredients. The compositions were as follows: WPC80 (whey protein concentrate, 80% protein), moisture 2.8%, protein 83.6%, fat 0.8, ash 3.3%, carbohydrate by difference; WLAC (whey lactalbumin), moisture 5.5%, protein 89.9%, fat 3.8, ash 0.5%, carbohydrate by difference; Whey Protein Isolate (WPI), moisture 2.8%, protein 89.6%, fat 25, ash 3.3%, carbohydrate by difference.

A ZSK-30 twin screw extruder (Krupp Werner Pfleiderer Co., Ramsey, N.J.) with a smooth barrel was used. The extruder had nine zones, and the effective cooking zones 6, 7, 8, and 9 were set to the same temperature for each test. To achieve different melt temperatures the cooking zones were set to the same barrel temperature of 35, 50, 75, or 100° C. respectively. Zones 1 to 3 were set to 35° C. and zones 4 and 5 were set to 75° C. Melt temperature was monitored behind the die. The die plate was fitted with two circular inserts of 3.18 mm diameter each. The screw elements were selected to provide low shear at 300 rpm; the screw profile was described by Onwulata et al. (Onwulata, C. I., et al., J. Food Sci. Vol., 63(5): 814-818). Feed was conveyed into the extruder with a series 6300 digital feeder, type T-35 twin screw volumetric feeder (K-tron Corp., Pitman, N.J.). The feed screw speed was set at 600 rpm, corresponding to a rate of 3.50 kg/h. Water was added into the extruder at the rate of 1.0 L/h with an electromagnetic dosing pump (Milton Roy, Acton, Mass.). Samples were collected after 25 min of processing, freeze-dried overnight in a VirTis Freeze Mobile 12XL Research Scale Freeze Dryer (Gardiner, N.Y.), and stored at 4.4° C. until analyzed. The experiments were performed in triplicate.

Analysis of variance was used to identify differences in physical properties at various processing conditions. Duncan's multiple range test was used for mean separation and correlation coefficients were calculated. The Statistical Analysis System (SAS) package was used (SAS Institute Inc, Cary, N.C.) in all cases. Significance of differences was defined as $P \leq 0.05$.

Moisture was determined by the AOAC (Association of Official Analytical Chemists) Official Method 925.10. Extrudate samples weighing approximately 1.5 g were dried in a vacuum oven at 100° C. overnight (AOAC, 2000, Official Methods of Analysis, 14th ed., Association of Official Analytical Chemists, Washington, D.C.).

Ash was determined by the AOAC Official Method 923.03. Ash was determined for each sample using 3 g assayed in a Muffler furnace at 550° C. for 16 h; percent ash was calculated.

Fat was determined using the AOAC Official Method 30-25. One gram extrudate sample was placed in an Erlenmeyer flask and 1 ml of sulfuric acid and 4 ml water was added to the flask. The samples were mixed gently and after 60 min were transferred to a 60 ml separatory funnel using 25 ml of dichloromethane:methanol solution (1:1). Extrudate samples were shaken and allowed to separate for 15 min. The bottom layer was drained into a weighing pan and then evaporated, and the amount of fat determined (American Association of Cereal Chemists, 1995, Approved Methods of the American Association of Cereal Chemists, 9th Edition., The Association, St Paul, Minn.).

Protein was determined with 0.2 g extrudate analyzed with the LECO Protein Analyzer Model FP2000 (LECO Corporation, St. Joseph, Mich.). Percent protein was calculated with the nitrogen conversion factor 6.38 for whey protein.

Gel strength was measured by Bloom determinations with a TA-XT2 Texture Analyzer (Ju, Z. Y., and A. Kilara, J. Food Sci. 63(2):288-292 (1998)). A 12% WPI solution was made (3.204 g of ground freeze-dried sample mixed with 26.7 ml deionized water and 3.3 ml 0.03 M CaCl$_2$), and allowed to sit for 15 min in a 50×70 mm cylindrical jar. The sample was heated to 80° C. for 30 min in a water bath, cooled in an ice bath for 15 min and then stored overnight at 4° C. The specimen was thawed at 25° C. in 50% relative humidity room. Gel strength was determined with a TA-XT2 Texture Analyzer running a penetration test with a 30 mm analytical probe to a depth of 6 mm at the rate of 1 mm/sec. The weak gels were easily deformed with evidence of syneresis.

Protein insolubility was determined with 1.0 g ground freeze-dried extrudate sample mixed-with 90 ml deionized water. The protein suspension was stirred at 125 rpm at pH 7.0 for 2 h. The suspension was centrifuged for 20 min and the supernatant was freeze dried overnight. The LECO Protein Analyzer Model FP2000 (LECO Corporation, St. Joseph, Mich.) was used to analyze the solids from the supernatant for protein content. Protein insolubility (denaturation) was calculated (Kilara, A., J. Dairy Sci., 67:2734-2744 (1984)) as: (% Total Protein–% Soluble Protein=% Insoluble (denatured)).

Foam volume and stability of extruded proteins were determined by heating 2.3 g samples mixed with 35 ml deionized water to 60° C. for 15 min. The slurry was then whipped for 15 sec in Waring Lab Micronizer FPC70 (Waring Products Division, New Hartford, Conn.), then transferred to a 100 ml graduated cylinder where the foam volume was read initially, and then every 5 min for 1 h. Foam stability (foam capacity at specific time) over the one hour period was calculated.

Protein Digestibility was determined with 10 ml extrudate sample dissolved in distilled water, the pH was adjusted to 8.0 with 0.1 N NaOH or HCl. One milliliter of freshly prepared enzyme stock solution (1.6 mg/ml trypsin, 3.1 mg/ml chymotrypsin, and 1.3 mg/ml aminopeptidase) was added to the protein suspension at 37° C. The pH after 10 min was recorded with a portable pH meter (IQ Scientific Instruments, Inc. San Diego, Calif.), and a Tris/HCl buffer containing 2.0% SDS (w/v) and 0.1% mercaptoethanol (v/v) was added to the protein solution which was immediately heated to 90° C. to terminate the enzymatic reaction. Samples were then analyzed by quantitative gel electrophoresis. The % protein digestibility was calculated by the following equation (Ju, Z. Y., and A. Kilara, J. Food Sci. 63(2):288-292 (1998)): % Digestibility=210.46 B 18.10(X); where X is the pH.

For SDS PAGE assay, samples were vortexed and dissolved in 20 mM TRIS/HCl, 5 mM EDTA, 2.5% SDS with and without 5.0% 2-mercaptoethanol at pH=8.0 then heated in boiling water for 2 min. Bromophenol blue is added to about 0.1% concentration. The samples were at 2 mg/ml concentration. Phast gels (Amersham Pharmaica Biotech, Uppsala, Sweden) were run according to the procedures given by the manufacturer for SDS 20% homogeneous gels. The 6 lane (4 ul per lane) sample applicators were used. Protein staining used the coomassie blue procedure given by the manufacturer (Farrell, H., E. D., et al., J. Dairy Sci., 81:2974-2984 (1998)).

For fine structure, transmission electron microscopy (TEM) was done of thin sections made from epoxyembedded samples. Millimeter-sized pieces of coarsely ground, freeze-dried segments of ribbons of the extrudates were immersed in 2.5% glutaraldehyde in 0.1 M imidazole buffer solution (pH 6.8) and stored in sealed vials at 4° C. For embedding and thin sectioning, the segments were washed in imidazole buffer, immersed in 2% osmium tetroxide in 0.1M imidazole buffer for 2 h at room temperature, washed in distilled water, and gradually dehydrated in a series of ethanol solutions and propylene oxide for one hour. Samples were then infiltrated with a 1:1 mixture of propylene oxide and epoxy resin mixture overnight and finally embedded in epoxy resin. Thin sections were cut and stained with 2% uranyl acetate, and lead citrate solutions. TEM was done in the bright field mode using a model CM12 electron microscope (FEI/Philips, Hillsboro, Oreg.). Average spacings of electron density, corresponding to fine structure in the extrudates, were estimated from the intensity distribution in Fourier transforms, computed from digital images made from TEM photographic negatives, recorded at 45,000×. Negatives were digitized using a Sprint-Scan 45 film scanner (Polaroid Corp., Cambridge, Mass.) and square areas of 2.8 megabyte images (512×512 pixels) were transformed after flattening, adjustment of brightness and contrast and one cycle of a low pass filter using a 3 H 3 pixel kernel in Image Pro Plus software (Media Cybernetics, Silver Spring, Md.). Line profiles of the radial distribution of intensity in the Fourier transforms were made, and reciprocal spacings were calculated based on the location of orders of peaks in transforms of a line grating with an equivalent spacing of 22 nm.

For scanning electron microscopy (SEM), a layer of dry powder particles was adsorbed onto conductive carbon adhesive tabs glued to aluminum specimen stubs (Electron Microscopy Sciences, Ft. Washington, Pa.), and the surface was coated with a thin layer of gold in a model Scancoat Six sputter coater (BOC Edwards, Wilmington, Mass.). Images of the powder particles were made with a model JSM 840A scanning electron microscope (JEOL USA, Peabody, Mass.) operating in the secondary electron imaging mode and integrated with a digital image workstation, model Imix1 (Princeton Gamma-Tech, Princeton, N.J.).

Results And Discussion: Extruding whey proteins at the preset temperature of 75° C. resulted in varying degrees of melt temperatures and denaturation for the different products (Table 1; % is percent of denatured proteins). Following extrusion, whey protein concentrate (WPC80) was the least denatured, and whey lactalbumin (WLAC) and whey protein isolates (WPI) were significantly (p<0.05) more denatured. WPI demonstrated the greatest effect, changing from 28 to 94.8% denatured. Therefore, further experiments were conducted with WPI.

The effect of extrusion cooking on denatured proteins was examined by electron microscopy. Changes in the microstructure of WPI and the ultrastructure of the denatured proteins are presented in FIG. 1. The microstructure of the dry powders, examined by scanning electron microscopy, reveal particles ranging from 10 to 50 micrometers in diameter (A). Transmission electron microscopy (B) shows the release of protein at the edge of powder particles after brief exposure to water typical of initial mixing in the extruder; irregular strings and granules, corresponding to molecular aggregates, ranging from less than 10 nm to over 200 nm can be seen (B). In contrast, the ultrastructure of extruder-denatured insoluble whey protein shows a closely-packed arrangement of electron dense particles, typical of denatured protein matrix, ranging from approximately 2 to 6 nm in diameter (C).

With the addition of shear in the extruder, significant unfolding (denaturation) occurred at 75° C. WPI extruded at preset temperatures at or above 50° C. denatured significantly (p<0.05) with increased preset temperature. The pH of the suspended protein remained stable as extrusion temperature increased, but measurable nitrogen (protein) increased as shown in Table 2. Loss of protein nitrogen might be expected as temperatures increased above 80° C., but I surprisingly observed no significant change in protein nitrogen content after drying. Though the amount of protein denatured increased, with increasing temperature, denaturation had minimal overall effect on protein digestibility. So the surprising result is increased protein denaturation without a significant loss of digestibility due to extrusion below 90° C.

Figure 2:
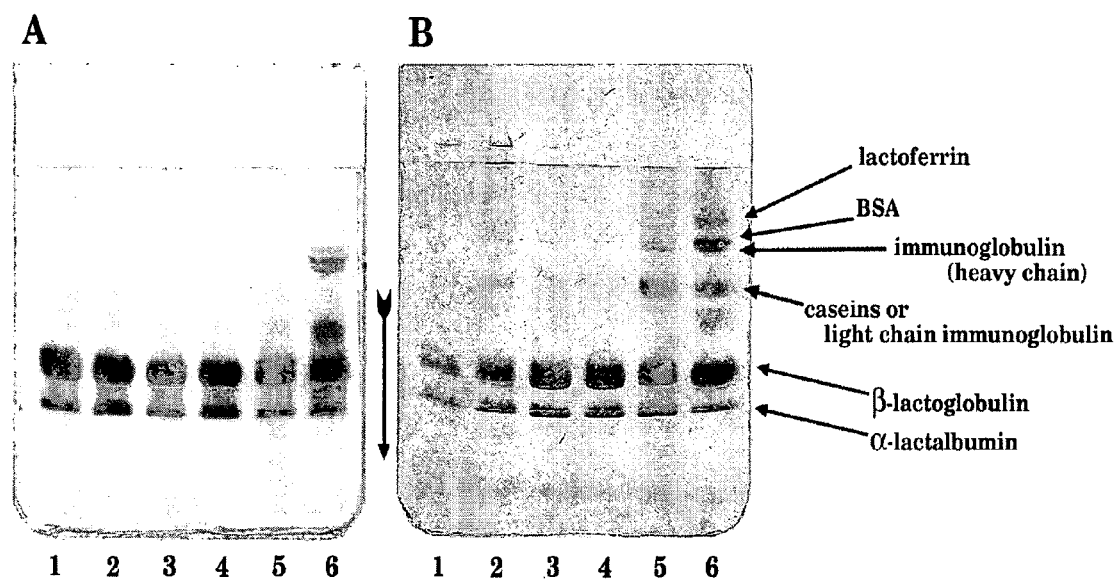
FIG. 2 shows SDS PAGE of extruded whey isolates: (A) with 2-mercaptoethanol; (B) without 2-mercaptoethanol; the lanes are: 1=100° C.; 2=75° C.; 3=50° C.; 4=35° C.; 5=Native WPI; 6=laboratory whey.

The WPI and variously heat treated samples were compared by SDS-PAGE (FIG. 2). SDS gel of the variously denatured WPI indicated minimal change in solubility (FIG. 2). SDS gels were initially developed without reducing reagent so the protein disulfide bonds are intact. The unreduced samples at 35° C. and 50° C. show somewhat diminished bands for the higher molecular weight whey proteins (B). However, at 50° C. and 70° C. samples were equivalent weight, and fainter than the native whey or whey proteins produced in the lab on the SDS gel (compare lanes 1 and 2 with 6 in FIG. 2). In this respect, the SDS gels parallel the solubility data in that increased temperature decreases solubility in SDS alone, indicating sulfhydryl-disulfide crosslinking. When the samples were reduced thoroughly and all disulfide bonds cleaved, all the extruded whey samples at the different temperatures were similar to each other and to the initial WPI (A). Thus, extruding whey even at the highest temperatures surprisingly does not affect the overall protein ratios. The native and extruded whey still have the same amount of the different proteins (FIG. 2) and their total nitrogen values were similar (Table 2).

Physical functional properties of extruded WPI such as gel strength, foam volume and stability were significantly affected at and above 75° C., and proportionally at lower preset temperatures. Greater than 30% moisture was needed to extrude the whey protein isolates, but the only significant change in moisture of the extruded products occurred at 100° C. (Table 3). Partial denaturation at temperatures between 35° and 50° C. significantly increased gel strength, but at 75° C. or higher complete loss of gelling property resulted. Foam volume remained high up to 50° C., but decreased significantly ($p<0.05$) after 75° C. Foam stability followed the same pattern as volume, being very stable for an hour below 50° C. However, with the addition of shear from the extruder, I observed significant loss of volume and stability.

Figure 3:
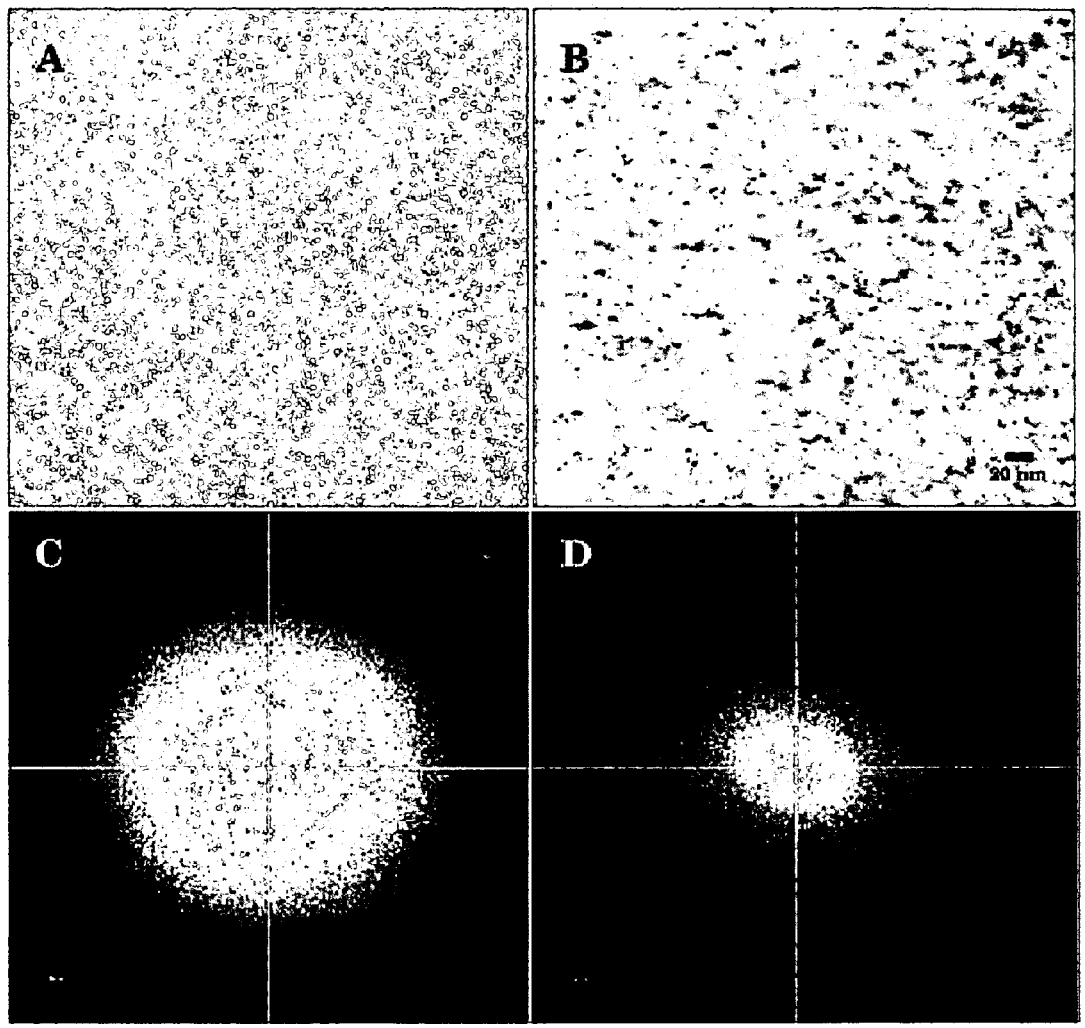
FIG. 3 shows transmission electron micrographs of whey protein isolates (WPI) positively stained with uranyl acetate and lead citrate: (A) enlargement of denatured whey as in FIG. 1C; (B) enlargement of a selected protein-dense area of FIG. 1B; (C) Fast Fourier Transforms of electron density images of native WPI; and (D) Fast Fourier Transforms of electron density images of denatured WPI.
Figure 4:
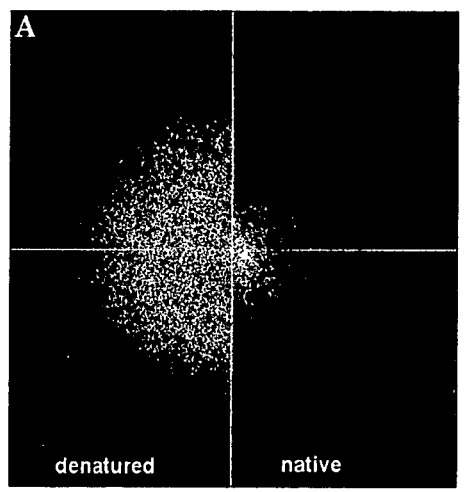
FIG. 4 shows electron-density mapping corresponding to the Fourier Transforms (A) for denatured and native WPI, and (B) inverse reciprocal spacing of electron-density images.
Figure 4:
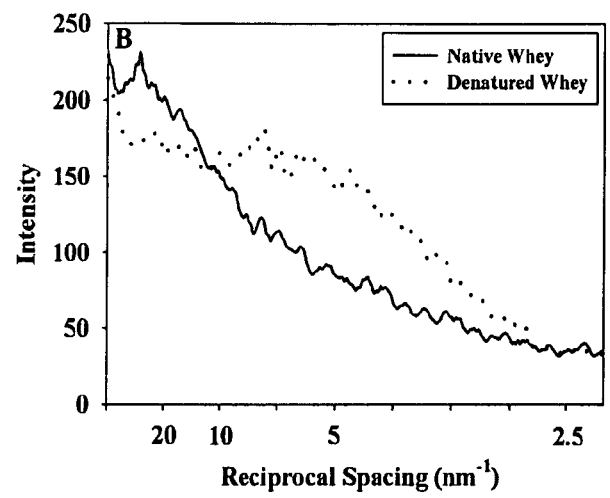

Denatured whey protein isolate looks quite different from the non-denatured proteins at the ultrastructural level (FIG. 3). As sampled, denatured proteins (3A) (WPI extruded at 100° C.) are densely packed with spacing of 2 to 6 nm, while non-denatured whey in the paste are loosely packed with a large spacing 200 to 350 nm (3B). The differences in fine structure of denatured and native whey protein are illustrated in FIGS. 3 and 4. In the "native" whey protein (40% slurry), the distribution of electron density surrounding the hydrating particles in FIG. 1B is an open network with clear, electron-lucent spaces ranging from 15-40 nm and irregular structures of electron density of similar dimensions. In contrast, the fine structure in segments where the whey proteins are completely denatured is limited to close-packed fine granules around 3-8 nm in diameter (FIG. 3). The corresponding computed Fourier transforms indicate that images of extrudate containing native whey proteins consist mainly of low spatial frequencies indicating structures with average spacings ranging from 15 to over 40 nm, whereas images of extrudate containing denatured whey proteins have little intensity at low spatial frequencies, but high intensity corresponding to high spatial frequencies, relating to electron density changes ranging from about 3 nm to less than 10 nm (FIG. 4). The constraint of extruding whey is keeping the temperature below the point where pyrosis will occur as evidenced by relatively constant nitrogen content (Table 2). I have seen evidence of fine structures with TEM images at 100° C. in whey isolates.

I have thus created structured networks in whey proteins using mild heat and shear, to create reversible denatured whey proteins. By understanding on a molecular basis the effects of shear, ways of creating new functionality can be developed. This will enable development of extrusion parameters that permit controlled denaturation of whey proteins.

Extrusion processing denatured whey protein concentrates, whey lactalbumin (LAC) and whey protein isolate (WPI), but the greatest amount of denaturing occurred with WPI. Denatured whey protein isolate retained its native protein value, functionality, and digestibility when extruded at 50° C. or below; changes in functionality occurred at 75 and 100° C. Through careful selection of extrusion conditions, denatured whey proteins with unique functionality were produced. Denaturation increased with temperature, but temperatures higher than 100° C. may be needed to form denatured fibrous products from whey protein isolates. I show here that extrusion is an effective tool for denaturing whey proteins to create denatured products. Texturization is the process of inducing new form and function in a polymer (e.g., protein), for example using the extrusion shearing process described herein to change the globular non-fibrous conformation of proteins (e.g., whey protein isolates) into structured fibrous forms that function differently. Extruding the whey protein isolate is what texturizes it. Without extrusion, the conformation of whey protein isolates can be changed (denatured) by heat or pH or pressure, but there is no texturization. The texturization process described herein involves heat, shear and pressure, unique conditions that denature and also texturize proteins such as whey protein isolates, with shear being the most important factor. Heat alone produces partially or totally denatured milk proteins. Traditionally, milk proteins are denatured by moist heat alone; this is the state of the art today and is accomplished without shear and at temperatures below 75° C. for 30 to 90 minutes, so texturization does not occur. Texturizing via the use of extrusion and heat accomplishes partial denaturation in less than 2 minutes in the temperature range of 50° to 80° C.

All of the references cited herein are incorporated by reference in their entirety. Also incorporated by reference in their entirety are the following references: Aboagye, Y., and Stanley, D. W., Can-Inst-Food-Sci-Technol-J., 20(3):148-153 (1987); Batterman-Azcona, S. J., and Hamaker, B. R., Cereal Chem., 75(2):217-221 (1998); Bhattarcharya, M., and Padmanabhan, M., 1999, Extrusion Processing: Texture and Rheology, In: "Wiley Encyclopedia of Food Science and Technology (2nd Edition), Editor, Frederick J. Francis, John Wiley & Sons, New York, N.Y.; Farrell, H. M., Jr., et al., J. Dairy Sci., 85(3):459-471 (2002); Hale, A. B., et al., J. Food Sci., 67(3):1267-1270 (2002); Harper, J. M., Extrusion of Foods, Vol. I., 1981, CRC Press, Boca Rotan, Fla.; Harwalkar, V. R., Michwissenchaft, 34(7):419-422 (1979); Hong, Y., and L. K. Creamer, Int'l. Dairy J., 12:345-359 (2002); Kim, C. H., and J. A. Maga, Lebensmittel-Wissenchaft und-Technologie, 20:311-318 (1987); Kester, J. J., and T. Richardson, J. Dairy Sci., 67(11):2757-2774 (1983); Kollengode, A. N., et al., J. Food Sci., 61(3): 596-599, 603 (1996); Linden, G., and Lorient, D., 1999, Extraction and Texturization Processes, In: New Ingredients in Food Processing, CRC Press, Boca Raton, Fla.; Martinez-Serna, M. D., and Villota, R., 1992, Reactivity, functionality, and extrusion performance of native and chemically modified whey proteins, pages 387-414 in Food Extrusion Science and Technology, J. L. Kokini, C. Ho, and M. V. Karwe, ed., Marcel Dekker, Inc. New York; Mohammed, Z. H., et al., J. Food Sci., 65(2):221-226 (2000); Kester, J. J., and T. Richardson, J. Dairy Sci., 67(11):2757-2774 (1983); Lin, S., et al., J. Food Sci., 67(3):1066-1072 (2000); Phillips, L. G., et al., J. Food Sci., 55(4):1116-1119 (1990); Singh, R. K., et al., J. Food Processing and Preservation, 15:285-302 (1991); Taylor, S.

M. and Fryer, P. J., Food Hydrocoll., 8 (1):45-61 (1994); Walstra, P., T. J., et al., 1999, pages 189-199 in Dairy Technology: Principles of Milk Properties and Processes, P. Walstra, T. J. Geurts, A. Noomen, A. Jellema, and M. A. J. S. van Boekel, ed., Marcel Dekker, Inc., New York; Yada, R. Y., et al., 1999, Proteins: Denaturation and Food Processing, In: "Wiley Encyclopedia of Food Science and Technology (2nd Edition), Editor, Frederick J. Francis, John Wiley & Sons, New York, N.Y.; U.S. Pat. No. 5,151,283.

Thus, in view of the above, the present invention concerns (in part) the following:

A dietary composition produced by a process consisting essentially of (or consisting of) extruding a protein containing product and water through an extruder at about 50-about 450 rpm and at a temperature of about 40° to about 120° C. to produce said dietary composition, wherein the residence time of said protein containing product in said extruder is about 15-about 90 seconds, wherein said dietary composition contains partially denatured protein containing product or totally denatured protein containing product or mixtures thereof; wherein said protein containing product is whey protein isolate. Generally, whey protein isolate contains at least 90% protein, preferably at least 95% protein, more preferably at least 98% protein, most preferably at least 99% protein.

The above dietary composition, wherein said temperature is about 90° to about 120° C., wherein said rpm is about 50-about 100 rpm, and wherein said dietary composition contains totally denatured protein containing product.

The above dietary composition, wherein said temperature is about 40° to about 90° C., wherein said rpm is about 150-about 250 rpm, and wherein said dietary composition contains partially denatured protein containing product.

The above dietary composition, wherein said dietary composition is produced by a process consisting of extruding a protein containing product and water through an extruder at about 50-about 450 rpm and at a temperature of about 40° to about 120° C. to produce said dietary composition, wherein the residence time of said protein containing product in said extruder is about 15-about 90 seconds, wherein said dietary composition contains partially denatured protein containing product or totally denatured protein containing product or mixtures thereof.

A food product comprising (or consisting essentially of or consisting of) at least one food ingredient and a dietary composition, said food product produced by a process comprising (or consisting essentially of or consisting of) extruding said dietary composition and said at least one food ingredient and water to produce said food product, said dietary composition produced by a process comprising (or consisting essentially of or consisting of) extruding a protein containing product and water through an extruder (e.g., at about 50-about 450 rpm and at a temperature of about 400 to about 120° C.) to produce said dietary composition, wherein said dietary composition contains partially denatured protein containing product or totally denatured protein containing product or mixtures thereof.

The above food product, said dietary composition produced by a process comprising (or consisting essentially of or consisting of) extruding a protein containing product and water through an extruder at about 50-about 450 rpm and at a temperature of about 40° to about 120° C. to produce said dietary composition.

The above food product, wherein the residence time of said protein containing product in said extruder is about 15-about 90 seconds.

The above food product, wherein said protein containing product is selected from the group consisting of milk, milk concentrate, milk protein concentrate, whey, whey concentrate, whey protein isolate, whey protein concentrate, and mixtures thereof.

The above food product, wherein said protein containing product is selected from the group consisting of whey concentrate, whey protein isolate, whey protein concentrate and mixtures thereof.

The above food product, wherein said protein containing product is whey protein concentrate.

The above food product, wherein said protein containing product is whey protein isolate.

The above food product, wherein said temperature is about 90° to about 120° C., wherein said rpm is about 50-about 100 rpm, and wherein said dietary composition contains totally denatured protein containing product.

The above food product, wherein said temperature is about 40° to about 90° C., wherein said rpm is about 150-about 250 rpm, and wherein said dietary composition contains partially denatured protein containing product.

The above food product, wherein said dietary composition contains totally denatured protein containing product and partially denatured protein containing product.

The above food product, wherein said food product is a puffed or expanded food product and said dietary composition contains partially denatured milk protein containing product.

The above food product, wherein said food ingredient is selected from the group consisting of corn, wheat, rice, barley, rye, potato, and mixtures thereof.

The above food product, wherein said food product comprises (or consists essentially of or consists of) at least one food ingredient and a dietary composition, said food product produced by a process comprising (or consisting essentially of or consisting of) extruding said dietary composition and said at least one food ingredient and water to produce said food product, said dietary composition produced by a process consisting essentially of extruding a protein containing product and water through an extruder to produce said dietary composition, wherein the residence time of said protein containing product in said extruder is about 15-about 90 seconds, wherein said dietary composition contains partially denatured protein containing product or totally denatured protein containing product or mixtures thereof.

The above food product, wherein said food product comprises (or consists essentially of or consists of) at least one food ingredient and a dietary composition, said food product produced by a process consisting essentially of extruding said dietary composition and said at least one food ingredient and water to produce said food product, said dietary composition produced by a process consisting essentially of extruding a protein containing product and water through an extruder at about 50-about 450 rpm and at a temperature of about 40° to about 120° C. to produce said dietary composition, wherein the residence time of said protein containing product in said extruder is about 15-about 90 seconds, wherein said dietary composition contains partially denatured protein containing product or totally denatured protein containing product or mixtures thereof.

The above food product, wherein said food product comprises (or consists essentially of or consists of) at least one food ingredient and a dietary composition, said food product produced by a process comprising (or consisting essentially of or consisting of) extruding said dietary composition and said at least one food ingredient and water to produce said food product, said dietary composition produced by a process consisting of extruding a protein containing product and water through an extruder at about 50-about 450 rpm and at a temperature of about 40° to about 120° C. to produce said dietary composition, wherein the residence time of said protein containing product in said extruder is about 15-about 90 seconds, wherein said dietary composition contains partially denatured protein containing product or totally denatured protein containing product or mixtures thereof.

The above food product, wherein said food product comprises (or consists essentially of or consists of) at least one food ingredient and a dietary composition, said food product produced by a process consisting essentially of extruding said dietary composition and said at least one food ingredient and water to produce said food product, said dietary composition produced by a process consisting of extruding a protein containing product and water through an extruder at about 50-about 450 rpm and at a temperature of about 40° to about 120° C. to produce said dietary composition, wherein the residence time of said protein containing product in said extruder is about 15-about 90 seconds, wherein said dietary composition contains partially denatured protein containing product or totally denatured protein containing product or mixtures thereof.

The above food product, wherein said food product comprises (or consists essentially of or consists of) at least one food ingredient and the above dietary composition, said food product produced by a process comprising extruding said dietary composition and said at least one food ingredient and water to produce said food product.

A food product comprising (or consisting essentially of or consisting of) at least one food ingredient and the above dietary composition, said food product produced by a process comprising (or consisting essentially of or consisting of) extruding said dietary composition and said at least one food ingredient and water to produce said food product.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

TABLE 1

Extrusion melt temperatures of whey proteins.

| Product | Melt Temperature (° C.) | Pre-Extrusion (%) | Post-Extrusion (%) |
|---|---|---|---|
| WPC80 | 70 ± 2 | 40.9 | 59.9 |
| WLAC | 75 ± 1 | 68.7 | 94.4 |
| WPI | 74 ± 1 | 28.0 | 94.8 |

WPC80: Whey Protein Concentrate, 80% protein.
WLAC: Whey Lactalbumin.
WPI: Whey Protein Isolate: Number reported is mean of three samples.

TABLE 2

Properties of whey protein isolate (WPI) as function of extrusion temperature.

| Extrusion Temp. (° C.)* | pH | Protein** (%) | Insoluble (%) | Digestibility (%) |
|---|---|---|---|---|
| 35 | 6.7 | 90.7 | 28.4 | 89.6 |
| 50 | 6.8 | 90.9 | 33.3 | 88.2 |
| 75 | 6.9 | 91.7 | 77.7 | 85.7 |
| 100 | 7.0 | 91.4 | 87.2 | 84.5 |
| PSD | 0.2 | 0.7 | 1.2 | 0.6 |

WPI: Whey protein isolates.
*Preset barrel temperature of zones 6, 7, 8, 9. PSD: Pooled Standard Deviation.
**% Protein after drying. Properties of non extruded WPI: pH 6.8, Protein 88.9%, Insoluble (Denatured) 28.0%, and Digestibility 87.7%.

TABLE 3

Physical properties of whey protein isolate (WPI) as function of extrusion temperature.

| Extrusion Temp. (° C.)* | Moisture (%) | Gel strength (N) | Foam volume (%) | Foam stability |
|---|---|---|---|---|
| 35 | 42.5 | 114.9 | 298.1 | 29.8 |
| 50 | 40.9 | 145.3 | 301.9 | 30.2 |
| 75 | 42.6 | 2.8 | 173.3 | 17.3 |
| 100 | 38.9 | # | 77.1 | 7.7 |
| PSD | 0.7 | 1.9 | 1.2 | 1.1 |

WPI: Whey protein isolates.
*Preset barrel temperature of zones 6, 7, 8, 9. PSD: Pooled Standard Deviation. Properties of non-extruded WPI: Moisture 1.94%, Gel Strength 52.3 (N), Foam volume 288%, and Foam stability 28.7%.
: Value Not Reported.

I claim:

1. A dietary composition produced by a process consisting of extruding a protein containing product and water through an extruder at about 50-about 450 rpm and at a temperature of about 40° to about 120° C. to produce said dietary composition, wherein the residence time of said protein containing product in said extruder is about 15-about 90 seconds, wherein said dietary composition contains partially denatured protein containing product or totally denatured protein containing product or mixtures thereof; wherein said protein containing product consists of whey protein isolate.

2. The dietary composition according to claim 1, wherein said temperature is about 90° to about 120° C., wherein said rpm is about 50-about 100 rpm, and wherein said dietary composition contains totally denatured protein containing product.

3. The dietary composition according to claim 1, wherein said temperature is about 40° to about 90° C., wherein said rpm is about 150-about 250 rpm, and wherein said dietary composition contains partially denatured protein containing product.

4. A food product comprising at least one food ingredient and a dietary composition, said food product produced by a process comprising extruding said dietary composition and said at least one food ingredient and water to produce said food product, said dietary composition produced by a process consisting of extruding a protein containing product and water through an extruder to produce said dietary composition, wherein said protein containing product consists of whey protein isolate and wherein said dietary composition contains partially denatured protein containing product or totally denatured protein containing product or mixtures thereof.

5. The food product according to claim 4, said dietary composition produced by a process consisting of extruding a protein containing product and water through an extruder at about 50-about 450 rpm and at a temperature of about 40° to about 120° C. to produce said dietary composition.

6. The food product according to claim 5, wherein the residence time of said protein containing product in said extruder is about 15-about 90 seconds.

7. The food product according to claim 4, wherein said temperature is about 90° to about 120° C., wherein said rpm is about 50-about 100 rpm, and wherein said dietary composition contains totally denatured protein containing product.

8. The food product according to claim 4, wherein said temperature is about 40° to about 90° C., wherein said rpm is about 150-about 250 rpm, and wherein said dietary composition contains partially denatured protein containing product.

9. The food product according to claim 4, wherein said dietary composition contains totally denatured protein containing product and partially denatured protein containing product.

10. The food product according to claim 4, wherein said food ingredient is selected from the group consisting of corn, wheat, rice, barley, rye, potato, and mixtures thereof.

11. The food product according to claim 4, wherein said food product consists of at least one food ingredient and a dietary composition, said food product produced by a process consisting of extruding said dietary composition and said at least one food ingredient and water to produce said food product, said dietary composition produced by a process consisting of extruding a protein containing product and water through an extruder to produce said dietary composition, wherein said dietary composition contains partially denatured protein containing product or totally denatured protein containing product or mixtures thereof.

\* \* \* \* \*